US008386924B2

(12) United States Patent
Fitzsimons et al.

(10) Patent No.: US 8,386,924 B2
(45) Date of Patent: *Feb. 26, 2013

(54) APPARATUS, METHOD AND SYSTEM FOR TRANSFORMING DATA

(76) Inventors: Edgar Michael Fitzsimons, New York, NY (US); Brian G. Fitzsimons, Short Hills, NJ (US); Erik Richard Langenbach, Yarmouth, ME (US)

( * ) Notice: Subject to any disclaimer, the term of this patent is extended or adjusted under 35 U.S.C. 154(b) by 825 days.

This patent is subject to a terminal disclaimer.

(21) Appl. No.: 11/779,481

(22) Filed: Jul. 18, 2007

(65) Prior Publication Data

US 2008/0021861 A1    Jan. 24, 2008

Related U.S. Application Data

(63) Continuation of application No. 09/932,656, filed on Aug. 17, 2001, now Pat. No. 7,260,777.

(51) Int. Cl.
*G06F 17/00* (2006.01)
(52) U.S. Cl. ........ 715/249; 715/235; 715/236; 715/243; 715/253
(58) Field of Classification Search .................. 715/235, 715/236, 243, 249, 253
See application file for complete search history.

(56) References Cited

U.S. PATENT DOCUMENTS

| | | | |
|---|---|---|---|
| 5,119,465 A | 6/1992 | Jack et al. | |
| 5,608,874 A | 3/1997 | Ogawa et al. | |
| 5,655,130 A | 8/1997 | Dodge et al. | |
| 5,845,299 A | 12/1998 | Arora et al. | |
| 5,911,776 A | 6/1999 | Guck | |
| 5,915,259 A | 6/1999 | Murata | |
| 6,097,389 A | 8/2000 | Morris et al. | |
| 6,275,829 B1 | 8/2001 | Angiulo et al. | |
| 6,336,124 B1* | 1/2002 | Alam et al. | 715/205 |
| 7,076,728 B2* | 7/2006 | Davis et al. | 715/205 |
| 7,120,869 B2 | 10/2006 | Birder | |
| 7,152,205 B2* | 12/2006 | Day et al. | 715/239 |
| 7,260,777 B2* | 8/2007 | Fitzsimons et al. | 715/255 |
| 2003/0074181 A1 | 4/2003 | Gharavy | |
| 2003/0149934 A1 | 8/2003 | Worden | |

OTHER PUBLICATIONS

"Methodology for Specifying a Document Transformation Override in a Sender Transform Implementation", IBM TDB vol. 34 No. 9, pp. 196-197, Feb. 1, 1992.

* cited by examiner

*Primary Examiner* — Stephen Hong
*Assistant Examiner* — Matthew Ludwig (57) ABSTRACT

An apparatus, method and system to automatically associate page elements, and convert and transform between disparate data and device format types. This allows for the ability to transform a single data source into multiple output composites suitable for deployment in disparate media outlets and on disparate output devices. Such automatic generation of disparate composites allows for the ability to take content written once in any given format and have said content automatically regenerated for any desired output outlet. The present disclosure further provides the ability to create and edit templates and data, and save edited changes affecting a single or a collection of templates. The invention teaches how to create associations from a piece of data and any of its page elements. Such associations facilitate the automatic transformation of the data into various output formats.

20 Claims, 6 Drawing Sheets

```
801  1 <textBox xpos="225" ypos="643.252" width="365.7266" height="21.2385"
     2 color="None" canEdit="true" zpos="0" numCols="1" angle="0"
     3 frameColor="Black" runaroundleft="15" runaroundright="6"
     4 runaroundtop="1" runaroundbottom="6" runaroundtype="" frameWidth="0">
     5      <textProperties/>
802  6      <textRange font="Times New Roman" size="9" color="heidelberg">
     7           <style name="Plain"/>
     8           <text>The 9200 is the first product from the ABC/XYZ
     9 collaboration.</text>
802  10     </textRange>
     11 </textBox>
```

Figure 8

| CW Element 501 | PDF Object 502 |
| --- | --- |
| Page 503 | Page 504 |
| Text Box 505 | Rectangle 506 |
| Text Range 507 | Text String w/ style attributes 508 |
| Picture Box 509 | Rectangle 510 |
| Picture 511 | XObject w/ Subtype = Image; image data provided as a Stream 512 |
| Line 513 | Line Segment 514 |

Figure 5

| CW Element 601 | HTML/CSS Object 602 |
| --- | --- |
| Page 603 | NA 604 |
| Text Box 605 | <DIV> w/ border attributes 606 |
| Text Range 607 | <DIV> w/ style attributes and text 608 |
| Picture Box 609 | <DIV> w/ border attributes 610 |
| Picture 611 | <IMG> 612 |
| Line 613 | Not Supported 614 |

Figure 6

```
[<command>]:
            <parameter>="<value>"
            ...
[<command>]:
            <parameter>="<value>"
            ...
    [<end command>]
    ...
[<end command>]
```

Figure 7

```
// load CW document into memory
[load file]:
            file="cwDocument.xml"
            refname="cwDoc"
[import XML]:
            xml="[Action.cwDoc]"
            datatree="cwDataTree"

// find all text in XML hierarchy with a unique identifier for the textbox it resides in
[search for elements in XML datatree]:
            datatree="[Action.cwDataTree]"
            resultList="textList"
            narrowSearch="element type='text' and 1st gen. parent element name='text'"
            extractElementData="3rd gen. parent attribute 'zpos' to 'textboxId' and this element's value to 'text'"

// loop through the resulting list of text elements and write the actual text to a file specific to the enclosing textbox
[for each item in datalist]:
            datalist="[Action:textList]"
            item="textItem"
            // write the text to the appropriate file
            [export to file]:
                        dataToWrite="[Action.textItem.text]"
                        filename="'textbox' + [Action.textItem.textboxId] + '.txt'"
                        append="true"
[end for each item in datalist]
```

Figure 9

| Source Format 1001 | Target Format 1002 | Filter 1003 |
|---|---|---|
| XML 1004 | XSL-FO 1005 | Apache Xalan 1006 |
| XSL-FO 1007 | PDF 1007 | Apache FOP 1008 |
| ... | | |
| Microsoft Word (.doc) 1009 | PDF 1010 | Adobe Distiller 1011 |

Figure 10

APPARATUS, METHOD AND SYSTEM FOR TRANSFORMING DATA

RELATED APPLICATIONS

This application is a continuation of co-pending U.S. application Ser. No. 09/932,656 filed Aug. 17, 2001, which is incorporated herein by reference.

This application hereby incorporates by reference US Patent Application entitled "Method of Constructing a Composite Image" filed on Aug. 17, 2001 in the name of E. Michael Fitzsimons, Brian G. Fitzsimons, and Erik Richard Langenbach.

This application hereby incorporates by reference U.S. patent application Ser. No. 08/941,442 entitled "Computer File Transfer System" filed on Sep. 30, 1997 in the name of E. Michael Fitzsimons, Brian G. Fitzsimons, and Colin Eric Snyder.

This application hereby incorporates by reference U.S. Continuation in Part patent application Ser. No. 09/536,014 entitled "Computer File Transfer System" filed on Mar. 27, 2000 in the name of E. Michael Fitzsimons, Brian G. Fitzsimons, and Colin Eric Snyder.

FIELD

The present invention relates generally to an apparatus, method and system to transforming data. More particularly, the disclosed invention relates to an apparatus, method and system to transforming data from varied data formats between varied device types.

BACKGROUND

Internet

As Internet usage increases, the amount of information available on the Internet also increases. The information that exists on the Internet is of many different types, including documents in many formats such as: computer software, databases, discussion lists, electronic journals, library catalogues, online information services, mailing lists, news groups, streaming media, and the like. Fortunately, much of the information on the Internet can be accessed through the World-Wide Web using a web browser to interact with the network in a user-friendly way.

Networks

Networks are commonly thought to consist of the interconnection and interoperation of clients, servers, and intermediary nodes in a graph topology. It should be noted that the term "server" as used herein refers generally to a computer, other device, software, or combination thereof that processes and responds to the requests of remote users across a communications network. Servers serve their information to requesting "clients." A computer, other device, software, or combination thereof that facilitates, processes information and requests, and/or furthers the passage of information from a source user to a destination user is commonly referred to as a "node." Networks are generally thought to facilitate the transfer of information from source points to destinations.

Transmission control Protocol-Internet Protocol (TCP/IP)

The proliferation and expansion of computer systems, databases, and networks of computers has been facilitated by an interconnection of such systems and networks in an extra-territorial communications network commonly referred to as the Internet. The Internet has developed and largely employs the Transmission Control Protocol-Internet Protocol (TCP/IP). TCP/IP was developed by a Department of Defense (DoD) research project to interconnect networks made by various and varying network vendors as a foundation for a network of networks, i.e., the Internet. The development of TCP/IP was in part driven by a requirement by the DoD to have a network that will continue to operate even if damaged during battle, thus allowing for information to be routed around damaged portions of the communications network to destination addresses. Of course, if the source or destination address location itself is rendered inoperable, such delivery will not be possible.

The Internet is a packet-switched network and thus, information on the Internet is broken up into pieces, called packets, and transmitted in packet form. The packets contain IP addressing information called headers, which are used by routers to facilitate the delivery of the packets from a source to a destination across intermediary nodes on the Internet. Upon arrival at the destination, the packets are reassembled to form the original message, and any missing packets are requested again.

The IP component of the protocol is responsible for routing packets of information based on a four byte addressing mechanism; the address is written as four numbers separated by dots, each number ranging from 0 to 255, e.g., "123.255.0.123". IP addresses are assigned by Internet authorities and registration agencies, and are unique.

The TCP portion of the protocol is used for verifying that packets of information are correctly received by the destination computer from the source, and if not, to retransmit corrupt packets. Other transmission control protocols are also commonly used that do not guarantee delivery, such as User Datagram Protocol (UDP).

World Wide Web

The proliferation and expansion of the Internet, and particularly the World Wide Web (the web), have resulted in a vast and diverse collection of information. Various user interfaces that facilitate the interaction of users with information technology systems (i.e., people using computers) are currently in use. An information navigation interface called WorldWideWeb.app (the web) was developed in late 1990. Subsequently, information navigation interfaces such as web browsers have become widely available on almost every computer operating system platform.

Generally, the web is the manifestation and result of a synergetic interoperation between user interfaces (e.g., web browsers), servers, distributed information, protocols, and specifications. Web browsers were designed to facilitate navigation and access to information, while information servers were designed to facilitate provision of information. Typically, web browsers and information servers are disposed in communication with one another through a communications network. Information Servers function to serve information to users that typically access the information by way of web browsers. As such, information servers typically provide information to users employing web browsers for navigating and accessing information on the web. Microsoft's Internet Explorer and Netscape Navigator are examples of web browsers. In addition, navigation user interface devices such as WebTV have also been implemented to facilitate web navigation. Microsoft's Information Server and Apache are examples of information servers.

Data Formats

The expansion of information technology and information delivery systems has furthered the expansion of content delivery systems. Various media outlets require the sharing of information. Various applications have been developed to serve the varied media outlets. Word processors, illustration programs, photo editing software, video editing software, web page creation software all create and save content in varied formats. Various conversion utilities have been developed to attempt to transfer content from one application format to another, but suffer from fidelity and formatting problems. Further complicating matters is that the varied media outlets offer content to varied output devices that have disparate output geometries that force content producers to manually tailor content for each of the device formats to which they wish to deliver their content. The development of XML based technology such as XML based style sheets allow content providers to manually create templates for each media outlet and device platform they wish to support.

SUMMARY

Accordingly, there exists a need for a device that will automatically generate and associate templates for the disparate media outlets, device output platforms, and media formats that automatically converts source data and formats, and generates composites in any desired output format. Such an apparatus is advantageous because it allows for the ability to transform a single data source into multiple output composites suitable for deployment in disparate media outlets and on disparate output devices.

In one embodiment of the present invention, an information transformation apparatus, comprises a processor; a memory, communicatively connected to the processor; and a program, stored in the memory, including: a module to create a target document in a desired output format for a desired output device, a module to create page elements in the target document that correspond to page elements from a source document, a module to extract information from the page elements from the source document and populating the target's page elements with the extracted information, and a module to transform the page elements in the target document based on a transformation table with formatting appropriate to the desired output format and desired output device.

In another embodiment of the present invention, an information transformation apparatus, comprises a processor; a memory, communicatively connected to the processor; and a program, stored in the memory, including: a module to identify a source of data; a module to identify a source device format type from the source data, if possible; a module to identify the source device format type, if not already identified; a module to identify a target device format type; a module to instantiate a source device format document based on the source device format type, if not already instantiated; a module to instantiate a target device format document based on the target device format type, if not already instantiated; a module to convert the source data for use in the source device format document, if necessary; a module to identify potential page elements from the source data; a module to generate source page elements with identifying source tags within the source device format document, if source data is un-referenced by source page elements; a module to populate source page elements with associated source data; a module to apply attributes associated with the source page elements to the populated source data; a module to identify page elements in the target device format type; a module to generate target page elements with identifying target tags corresponding to source page elements, if the source page elements have no corresponding target page elements; a module to transform attributes associated with the generated target page elements according to attributes associated with the target device format document, if available, otherwise using, a module to identify transformation parameters for transforming target page elements based on the differences between the source device format type and target device format type, and a module to transform attributes associated with the generated target page elements according to a the transformation parameters; a module to populate target page elements corresponding to source page elements with source data; and a module to apply attributes associated with the target page elements to the populated source data.

The above advantages and features are of representative embodiments only, and are not exhaustive and/or exclusive. They are presented only to assist in understanding the invention. It should be understood that they are not representative of all the inventions defined by the claims, to be considered limitations on the invention as defined by the claims, or limitations on equivalents to the claims. For instance, some of these advantages may be mutually contradictory, in that they cannot be simultaneously present in a single embodiment. Similarly, some advantages are applicable to one aspect of the invention, and inapplicable to others. Furthermore, certain aspects of the claimed invention have not been discussed herein. However, no inference should be drawn regarding those discussed herein relative to those not discussed herein other than for purposes of space and reducing repetition. Thus, this summary of features and advantages should not be considered dispositive in determining equivalence. Additional features and advantages of the invention will become apparent in the following description, from the drawings, and from the claims.

BRIEF DESCRIPTION OF THE DRAWINGS

The accompanying drawings illustrate certain embodiments of the disclosure.

DETAILED DESCRIPTION

Data Transformation Client Tool Controller

Figure 1:
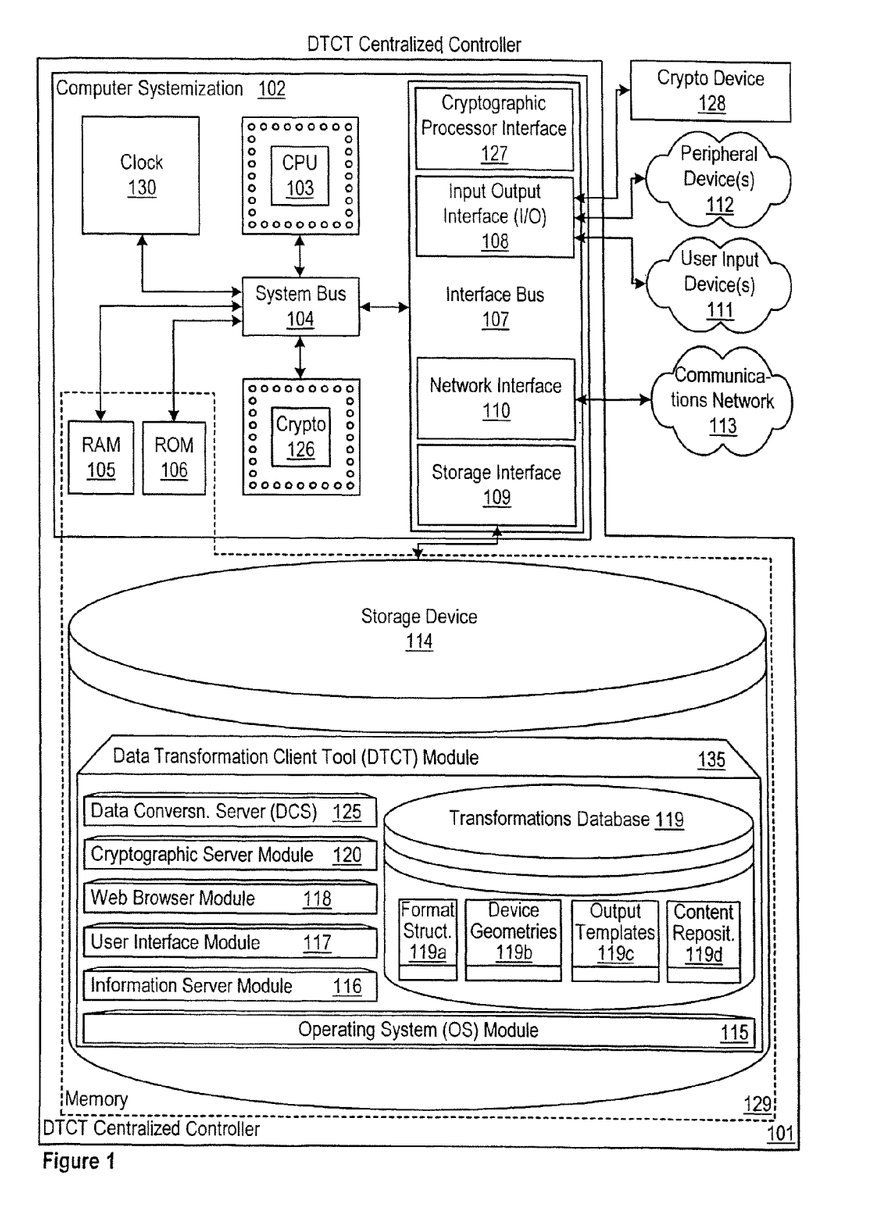
FIG. 1 illustrates one non-limiting example embodiment describing a Data Transformation Client Tool (DTCT) controller by way of block diagram.

FIG. 1 illustrates one non-limiting example embodiment describing a Data Transformation Client Tool (DTCT) controller 101 by way of block diagram. In this embodiment, the DTCT controller 101 may serve to convert and transform data from a given source format and device type to another target format and device type automatically, and/or the like.

In one embodiment, the DTCT controller 101 may be connected to and/or communicate with entities such as, but not limited to: one or more users from user input devices 111; peripheral devices 112; and/or a communications network 113. The DTCT controller may even be connected to and/or communicate with a cryptographic processor device 128.

A typical DTCT controller 101 may be based on common computer systems that may comprise, but are not limited to, components such as: a computer systemization 102 connected to memory 129.

Computer Systemization

A computer systemization 102 may comprise a clock 130, central processing unit (CPU) 103, a read only memory (ROM), a random access memory (RAM), and/or an interface bus 107, and conventionally, although not necessarily, are all interconnected and/or communicating through a system bus 104. The system clock typically has a crystal oscillator and provides a base signal. The clock is typically coupled to the system bus and various means that will increase or decrease the base operating frequency for other components interconnected in the computer systemization. The clock and various components in a computer systemization drive signals embodying information throughout the system. Such transmission and reception of signals embodying information throughout a computer systemization may be commonly referred to as communications. These communicative signals may further be transmitted, received, and the cause of return and/or reply signal communications within the computer systemization 102 from memory 129, and from beyond the instant computer systemization to: communications networks, input devices, other computer systemizations, peripheral devices, and/or the like. Optionally, a cryptographic processor 126 may similarly be connected to the system bus. Of course, any of the above components may be connected directly to one another, connected to the CPU, and/or organized in numerous variations employed as exemplified by various computer systems.

The CPU comprises at least one high-speed data processor adequate to execute program modules for executing user and/or system-generated requests. The CPU may be a microprocessor such as the Intel Pentium Processor and/or the like. The CPU interacts with memory through signal passing through conductive conduits to execute stored program code according to conventional data processing techniques. Such signal passing facilitates communication within the DTCT controller and beyond through various interfaces.

Interface Adapters

Interface bus(ses) 107 may accept, connect, and/or communicate to a number of interface adapters, conventionally although not necessarily in the form of adapter cards, such as but not limited to: input output interfaces (I/O) 108, storage interfaces 109, network interfaces 110, and/or the like. Optionally, cryptographic processor interfaces 127 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (PCI), Personal Computer Memory Card International Association (PCMCIA), and/or the like.

Storage interfaces 109 may accept, communicate, and/or connect to a number of storage devices such as, but not limited to: storage devices 114, removable disc devices, and/or the like. Storage interfaces may employ connection protocols such as, but not limited to: (Ultra) Advanced Technology Attachment (Packet Interface) ((Ultra) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 110 may accept, communicate, and/or connect to a communications network 113. Network interfaces may employ connection protocols such as, but not limited to: direct connect, Ethernet (thick, thin, twisted pair 10/100/1000 Base T, and/or the like), Token Ring, wireless connection such as IEEE 802.11b, and/or the like. A communications network may be any one and/or the combination of the following: a direct interconnection; the Internet; a Local Area Network (LAN); Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface.

Input Output interfaces (I/O) 108 may accept, communicate, and/or connect to user input devices 111, peripheral devices 112, cryptographic processor devices 128, and/or the like. I/O may employ connection protocols such as, but not limited to: Apple Desktop Bus (ADB); Apple Desktop Connector (ADC); audio: analog, digital, monaural, RCA, stereo, and/or the like; IEEE 1394; infrared; joystick; keyboard; midi; optical; PC AT; PS/2; parallel; radio; serial; USB; video interface: BNC, composite, digital, RCA, S-Video, VGA, and/or the like; wireless; and/or the like. A common output device is a video display, which typically comprises a CRT or LCD based monitor with an interface (e.g., VGA circuitry and cable) that accepts signals from a video interface. The video interface composites information generated by a computer systemization and generates video signals based on the composited information. Typically, the video interface provides the composited video information through a video connection interface that accepts a video display interface (e.g., a VGA connector accepting a VGA display cable).

User input devices 111 may be card readers, dongles, finger print readers, gloves, graphics pads, joysticks, keyboards, mouse (mice), trackballs, trackpads, retina readers, and/or the like.

Peripheral devices 112 may be connected and/or communicate with or to I/O and/or with or to other facilities of the like such as network interfaces, storage interfaces, and/or the like). Peripheral devices may be cameras, dongles (for copy protection, ensuring secure transactions as a digital signature, and/or the like), external processors (for added functionality), goggles, microphones, monitors, network interfaces, printers, scanners, storage devices, visors, and/or the like.

Cryptographic units such as, but not limited to, microcontrollers, processors 126, interfaces 127, and/or devices 128 may be attached, and/or communicate with the DTCT controller. A MC68HC16 microcontroller, commonly manufactured by Motorola Inc., may be used for and/or within cryptographic units. Equivalent microcontrollers and/or processors may also be used. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Other commercially available specialized cryptographic processors include VLSI Technology's 33 MHz 6868 or Semaphore Communications' 40 MHz Roadrunner284.

Memory

A storage device 114 may be any conventional computer system storage. Storage devices may be a fixed hard disk drive, and/or other devices of the like. However, it is to be understood that a DTCT controller and/or a computer systemization may employ various forms of memory 129. For example, a computer systemization may be configured wherein the functionality of on-chip CPU memory (e.g., registers), RAM, ROM, and any other storage devices are provided by a paper punch tape or paper punch card mechanism; of course such an embodiment is not preferred and would result in an extremely slow rate of operation. In a typical configuration, memory 129 will include ROM, RAM, and a storage device 114. Generally, any mechanization and/or embodiment allowing a processor to affect the storage and/or retrieval of information is regarded as memory 129. Thus, a computer systemization generally requires and makes use of memory. However, memory is a fungible technology and resource, thus, any number of memory embodiments may be employed in lieu of or in concert with one another.

Module Collection

The storage devices 114 may contain a collection of program and/or database modules and/or data such as, but not limited to: an operating system module 115 (operating system); an information server module 116 (information server); a user interface module 117 (user interface); a web browser module 118 (web browser); databases 119; a cryptographic server module 120 (cryptographic server); Data Transformation Client Tool (DTCT) module 125; and/or the like (i.e., collectively a module collection). These modules may be stored and accessed from the storage devices and/or from storage devices accessible through an interface bus. Although non-conventional software modules such as those in the module collection, typically and preferably, are stored in a local storage device 114, they may also be loaded and/or stored in memory such as: peripheral devices, RAM, remote storage facilities through a communications network, ROM, various forms of memory, and/or the like.

Operating System

The operating system module 115 is executable program code facilitating the operation of a DTCT controller. Typically, the operating system facilitates access of I/O, network interfaces, peripheral devices, storage devices, and/or the like. The operating system preferably is a conventional product such as Apple Macintosh OS X Server, AT&T Plan 9, Microsoft Windows NT Server, Unix, and/or the like operating systems. Preferably, the operating system is highly fault tolerant, scalable, and secure. An operating system may communicate to and/or with other modules in a module collection, including itself, and/or facilities of the like. Conventionally, the operating system communicates with other program modules, user interfaces, and/or the like. For example, the operating system may contain, communicate, generate, obtain, and/or provide program module, system, user, and/or data communications, requests, and/or responses. The operating system, once executed by the CPU, may enable the interaction with communications networks, data, I/O, peripheral devices, program modules, memory, user input devices, and/or the like. Preferably, the operating system provides communications protocols that allow the DTCT controller to communicate with other entities through a communications network 113. Various communication protocols may be used by the DTCT controller as a subcarrier transport mechanism, such as, but not limited to: multicast, TCP/IP, UDP, unicast, and/or the like.

Information Server

An information server module 116 is stored program code that is executed by the CPU. The information server may be a conventional Internet information server such as, but not limited to, Microsoft's Internet Information Server and/or the Apache Software Foundation's Apache. Preferably, the information server allows for the execution of program modules through facilities such as C++, Java, JavaScript, ActiveX, Common Gateway Interface (CGI) scripts, Active Server Page (ASP), scripts for a Content Scripting Engine (CSE), and/or the like. Preferably the information server supports secure communications protocols such as, but not limited to, File Transfer Protocol (FTP); HyperText Transfer Protocol (HTTP); Secure Hypertext Transfer Protocol (HTTPS), Secure Socket Layer (SSL), Extensible Markup Language (XML) and other such variants provide greater functionality, and/or the like. Conventionally, an information server provides results in the form of web pages to web browsers, and allows for the manipulated generation of the web pages through interaction with other program modules. After a DNS resolution portion of an HTTP request is resolved to a particular information server, the information server resolves requests for information at specified locations on a DTCT controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for "/myInformation.html" portion of the request and resolve it to a location in memory containing the information "myInformation.html." An information server may communicate to and/or with other modules in a module collection, including itself, and/or facilities of the like. Most frequently, the information server communicates with operating systems, other program modules, user interfaces, web browsers, and/or the like. An information server may contain, communicate, generate, obtain, and/or provide program module, system, user, and/or data communications, requests, and/or responses.

User Interface

A user interface module 117 is stored program code that is executed by the CPU. Preferably, the user interface is a conventional graphic user interface as provided by, with, and/or atop operating systems and/or operating environments such as Apple Macintosh OS, e.g., Aqua, Microsoft Windows (NT), Unix X Windows (KDE, Gnome, and/or the like), and/or the like. The user interface may allow for the display, execution, interaction, manipulation, and/or operation of program modules and/or system facilities through textual and/or graphical facilities. The user interface provides a facility through which users may affect, interact, and/or operate a computer system. Graphical User Interfaces (GUIs) provide widgets (e.g., buttons, menus, windows, et al.) that a user may interact with through the manipulation of a pointing device, e.g., a mouse that controls and on screen cursor. A user interface may communicate to and/or with other modules in a module collection, including itself, and/or facilities of the like. Most frequently, the user interface communicates with operating systems, other program modules, and/or the like. The user interface may contain, communicate, generate, obtain, and/or provide program module, system, user, and/or data communications, requests, and/or responses.

Web Browser

A web browser module 118 is stored program code that is executed by the CPU. Preferably, the web browser is a conventional hypertext viewing application such as Microsoft Internet Explorer or Netscape Navigator (preferably with 128 bit encryption by way of HTTPS, SSL, and/or the like). Some web browsers allow for the execution of program modules through facilities such as Java, JavaScript, ActiveX, and/or the like. Web browsers and like information access tools may be integrated into PDAs, cellular telephones, and/or other mobile devices. A web browser may communicate to and/or with other modules in a module collection, including itself, and/or facilities of the like. Most frequently, the web browser communicates with information servers, operating systems, integrated program modules (e.g., plug-ins), and/or the like; e.g., it may contain, communicate, generate, obtain, and/or provide program module, system, user, and/or data communications, requests, and/or responses. Of course, in place of a web browser and information server, a combined application may be developed to perform similar functions of both. The combined application would similarly affect the obtaining and the provision of information to users, user agents, and/or the like from DTCT enabled nodes. The combined application may be nugatory on systems employing standard web browsers. Such a combined module could be configured to communicate directly with the DTCT without an intermediary information server to further enhance security.

Transformation Database

A transformation database module 119 may be embodied in a database that is stored program code that is executed by the CPU and its stored data; the stored program code portion configuring the CPU to process the stored data. Alternatively, the transformation database may be implemented using various standard data structures, such as an array, hash, (linked) list, stored files in a file system, struct, and/or the like. If the transformation database is implemented as a data structure, the use of the transformation database may be integrated into another module such as the DTCT module 135. In one non-limiting example embodiment, the database module 119 includes tables such as but not limited to a format structure table 119a, device geometries table 119b, output template table 119c, content repository table 119d, a format conversion table (not pictured), a format transformation table (not pictured), and/or the like. All the tables may be related by a device type key field entries as they are unique. A transformation database may communicate to and/or with other modules in a module collection, including itself, and/or facilities of the like. Most frequently, the transformation database communicates with a DTCT module, other program modules, and/or the like. The database may contain, retain, and provide information regarding other nodes and data.

Cryptographic Server

A cryptographic server module 120 is stored program code that is executed by the CPU 103, cryptographic processor 126, cryptographic processor interface 127, cryptographic processor device 128, and/or the like. Preferably, cryptographic processor interfaces will allow for expedition of encryption and/or decryption requests by the cryptographic module; however, the cryptographic module, alternatively, may run on a conventional CPU. Preferably, the cryptographic module allows for the encryption and/or decryption of provided data. Preferably, the cryptographic module allows for both symmetric and asymmetric (e.g., Pretty Good Protection (PGP)) encryption and/or decryption. Preferably, the cryptographic module allows conventional cryptographic techniques such as, but not limited to: digital certificates (e.g., X.509 authentication framework), digital signatures, dual signatures, enveloping, password access protection, public key management, and/or the like. Preferably, the cryptographic module will facilitate numerous encryption and/or decryption protocols such as, but not limited to: Data Encryption Standard (DES), Elliptical Curve Encryption (ECC), International Data Encryption Algorithm (IDEA), Message Digest 5 (MD5, which is a one way hash function), RC5 (Rivest Cipher), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. A cryptographic module may communicate to and/or with other modules in a module collection, including itself, and/or facilities of the like. Preferably, the cryptographic module supports encryption schemes allowing for the secure transmission of information across a communications network to enable a DTCT module to engage in secure transactions if so desired by users. Most frequently, the cryptographic module communicates with information servers, operating systems, other program modules, and/or the like. The cryptographic module may contain, communicate, generate, obtain, and/or provide program module, system, user, and/or data communications, requests, and/or responses.

Data Conversion Server (DCS)

A DCS module 125 is stored program code that is executed by the CPU. Generally, the DCS affects accessing, obtaining and the provision of information, and/or the like between nodes on a communications network. The DCS has the ability to generate transformation tables from a transformations database on demand by querying the various tables to select and join the various device geometries 119b and output templates 119c. More importantly, the DCS will import and covert source data and template/device format types to target data and template/device format types Furthermore, the DCS acts as a general data access facility for stored data. The DCS is described in greater detail in co-pending applications entitled "Computer File Transfer System," Ser. Nos. 08/941, 442 and 09/536,014. The DCS may include a Content Scripting Engine (CSE), a Data Access Engine (DAE), a User Management Engine (UME), Configuration Engine (CE), and a Transformation Engine (TE). The TE contains transformation tables that may be used by the DTCT to transform document geometries, page element geometries and/or the like from one device format into another. The CSE allows for customized transformations that are not provided for in the TE to be scripted and enables the execution of such scripts to further transform documents. The UME allows users to login to the DCS and allows an administrator to set permissions based on logins. The CE allows for the configuration of the DCS and user interface. The DAE allows for the conversion and interchange of documents in various data formats upon demand and/or request. The DCS coordinates with the transformation database to identify template/device types for resolving to various requested output device format, and/or the like. A DCS enabling access of and transformation of information by Data Transformation Client Tools (DTCTs) may be developed by employing standard development tools such as, but not limited to: C++, shell scripts, Java, Javascript, SQL commands, web application server extensions, Apache modules, Perl scripts, binary executables, and/or other mapping tools, and/or the like. In one non-limiting example embodiment, the DCS server employs a cryptographic server to encrypt and decrypt communications. The DCS may service requests, execute scripts (i.e., via CSE), update content repositories, and much more. A DCS module may communicate to and/or with other modules in a module collection, including itself, and/or facilities of the like. Most frequently, the DCS module communicates with a DTCT client and database, operating systems, other program modules, and/or the like. The DCS may contain, communicate, generate, obtain, and/or provide program module, system, user, and/or data communications, requests, and/or responses.

Data Transformation Client Tool (DTCT)

A DTCT module 135 is stored program code that is executed by the CPU. Generally, the DTCT affects accessing, obtaining and the provision of information, and/or the like between nodes on a communications network. More importantly, the DTCT will transform source data and template/device format types to target data and template/device format types The DTCT allows for the creation, editing, importing, and transforming of disparate device output format types, and/or the like. A DTCT enabling such transformation maybe be developed by employing standard development tools such as, but not limited to: C++, shell scripts, Java, Javascript, SQL commands, web application server extensions, Apache modules, Perl scripts, binary executables, and/or other mapping tools, and/or the like. In one non-limiting example embodiment, the DTCT server employs a cryptographic server to encrypt and decrypt communications. The DTCT may make requests conversion and/or importation requests of the DCS, and much more. A DTCT module may communicate to and/or with other modules in a module collection, including itself, and/or facilities of the like. Most frequently, the DTCT module communicates with a transformation database, a DCS module, operating systems, other program modules, and/or the like. The DTCT may contain, communicate, generate, obtain, and/or provide program module, system, user, and/or data communications, requests, and/or responses.

Distributed DTCT

The functionality of any of the DTCT controller 101 components may be combined, consolidated, and/or distributed in any number of ways to facilitate development and/or deployment. Similarly, the module collection may be combined in any number of ways to facilitate deployment and/or development. To accomplish this, one must simply integrate the components into a common code base or in a facility that can dynamically load the components on demand in an integrated fashion.

The module collection may be consolidated and/or distributed in countless variations through standard data processing and/or development techniques. Multiple instances of any one of the program modules in the program module collection may be instantiated on a single node, and/or across numerous nodes to improve performance through load balancing data processing techniques. Furthermore, single instances may also be distributed across multiple controllers and/or storage devices; e.g., databases.

The preferred node controller configuration will depend on the context of system deployment. Factors such as, but not limited to, the capacity and/or location of the underlying hardware resources may affect deployment requirements and configuration. Regardless of if the configuration results in more consolidated and/or integrated program modules, results in a more distributed series of program modules, and/or results in some combination between a consolidated and/or distributed configuration, communication of data may be communicated, obtained, and/or provided. Instances of modules (from the module collection) consolidated into a common code base from the program module collection may communicate, obtain, and/or provide data. All program module instances and controllers working in concert may do so through standard data processing communication techniques. This may be accomplished through standard data processing techniques such as, but not limited to: data referencing (e.g., pointers), internal messaging, object instance variable communication, shared memory space, variable passing, and/or the like (intra-application communication).

If module collection components are discrete, separate, and/or external to one another, then communicating, obtaining, and/or providing data with and/or to other module components may be accomplished through standard data processing techniques such as, but not limited to: Application Program Interfaces (API) information passage; (distributed) Component Object Model ((D)COM), (Distributed) Object Linking And Embedding ((D)OLE), and/or the like), Common Object Request Broker Architecture (CORBA), process pipes, shared files, and/or the like (inter-application communication). Messages sent between discrete module components for inter-application communication or within memory spaces of a singular module for intra-application communication may be facilitated through the creation and parsing of a grammar. A grammar may be developed by using standard development tools such as lex, yacc, XML based parsing tools, and/or the like, which allow for grammar generation and parsing functionality, which in turn may form the basis of communication messages within and between modules. Again, the preferable embodiment will depend upon the context of system deployment. Finally, it is to be understood that the logical or topological structure of any combination of the module collection are not limited to a fixed execution order and/or arrangement, but rather, any disclosed order is exemplary and all functional equivalents, regardless of order, are contemplated by the disclosure.

Data Transformation System Data Flow

Figure 2:
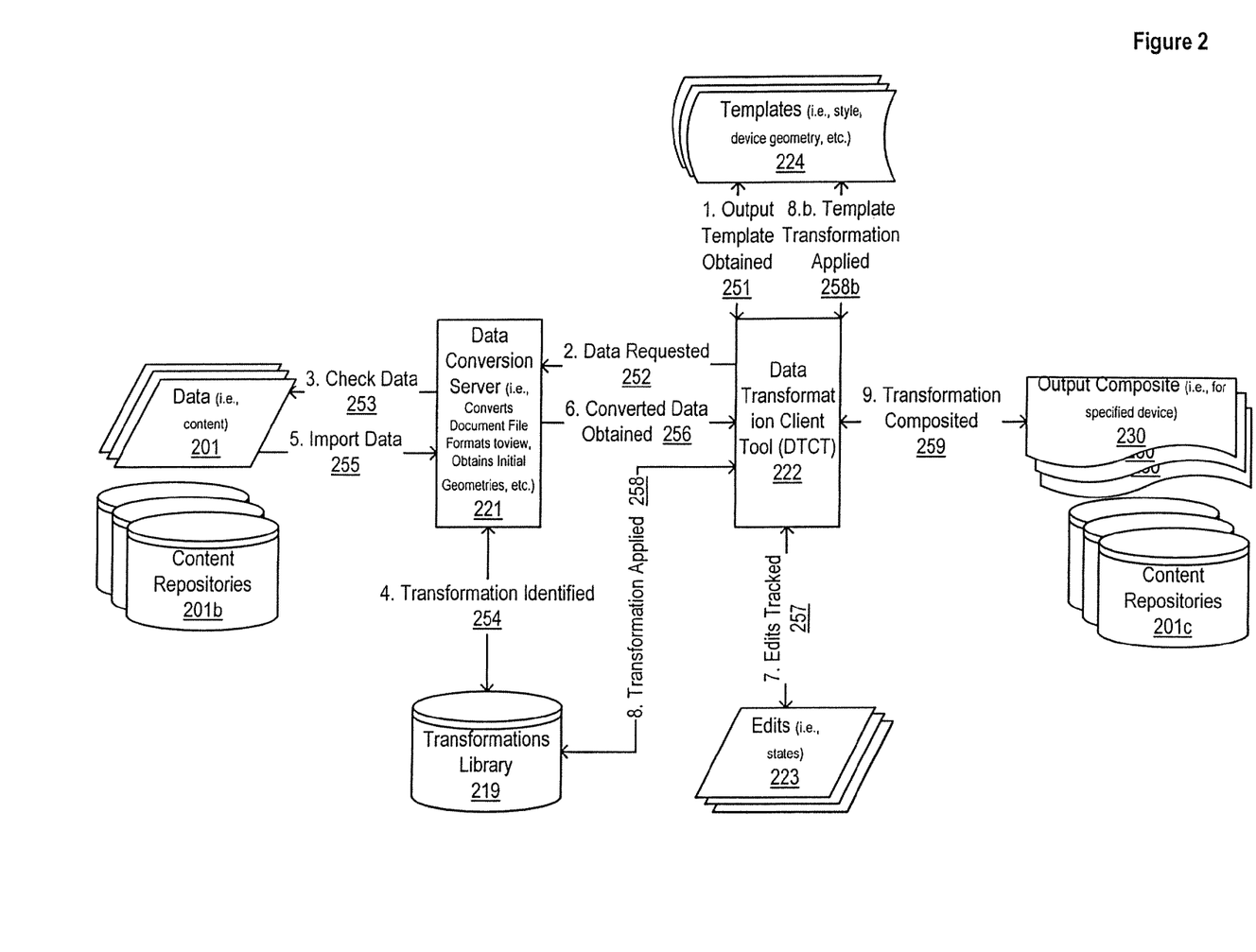
FIG. 2 illustrates one non-limiting example overview data-flow diagram of a data transformation system.

FIG. 2 illustrates one non-limiting example overview dataflow diagram of a data transformation system. Initially a Data Transformation Client Tool (DTCT) 222 is loaded into memory on a client machine and executed. The DTCT allows a user to request the transformation of a data collection from one viewing format into another. It is important to note that user requests and interaction are not only limited to human users interacting through user input devices, but may also be system prompted activities, such as, but not limited to cron jobs, system generated signals, and/or the like. This transformation is accomplished by first obtaining a template to view desired data. This template may be obtained 251 by requesting it from a templates collection 224, such as those stored in a transformations library 219 in an output templates 119c table, and/or the like. If no particular template is selected, a default blank document may be loaded from a specified template. In one non-limiting example, the default new document template designates a web page as the output device, and is based in XML code. It should be noted that in one example embodiment, a collection of templates may be created using XSLT based forms to ease transformations. In loading the templates, the DTCT makes a request to read the template from memory and creates an internal data structure interpreting the read template. In one non-limiting example, the templates are in XML format and include style sheet and transformation information, which is rasterized and interpreted. The imaging of the templates is accomplished (as described in co-pending US Patent Application entitled "Method of Constructing a Composite Image" filed on Aug. 17, 2001 in the name of E. Michael Fitzsimons, Brian G. Fitzsimons, and Erik Richard Langenbach.) It should be noted, that the DTCT may also load templates that already have data composted within, and such template documents shall be referred to henceforth ad output composites 230.

Upon obtaining an initial template for an initial data view 251, the user may alter the template by editing page elements (as described in co-pending US Patent Application entitled "Method of Constructing a Composite Image" filed on Aug. 17, 2001 in the name of E. Michael Fitzsimons, Brian G. Fitzsimons, and Erik Richard Langenbach, which referred to page elements as images and/or image composites). Thereafter, the user may wish to import data into the currently loaded template's page elements. To do so, the user is prompted to select desired data. This may be accomplished through a standard file system file request dialogue box, and/or the like 252. In one non-limiting example, the DTCT makes this request of the DCS 221.

The DCS will take the requested file identifier and load and check it 253 either by loading the data 201 from a file system or locating it in a transformations library 219 in a content repository 201*b*, 201*c*, 119*d* with which the DCT is disposed in communication. The DCT 221 examines the data 253 and determines the type of data that is requested by the user. The DCT may determine the data type by comparing the requested data against format structures 119*a* contained within the transformations library; this may be accomplished as discussed in co-pending applications entitled "Computer File Transfer System," Ser. Nos. 08/941,442 and 09/536,014. In a simple non-limiting example, the requested data's file extension may be used to locate the proper transformation 254. For example, if the requested data is a Microsoft Word document, and the current template is being constructed for web page viewing, i.e., in XML, the DCT would query the transformations library 219 for a Microsoft Word to XML transformation filter. It should be noted that in practice, the actual transformation tables may be coded directly into the DCT rather than being located in a transformations library employing standard data structures.

Figure 10:
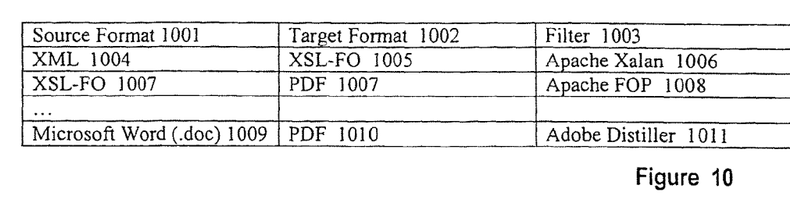
FIG. 10 illustrates one non-limiting example of a transformation table data structure.

In one non-limiting example data structure, as pictured in FIG. 10, a simple conversion look-up table is employed wherein there is a column identifying the format for the source of the data 1001, a second column identifying the desired output format for the data 1002, and a third column identifying the location of the translation filter to be used 1003. The source document's file type may be identified by parsing the source document's file extension, and/or content for know tags/markers and comparing them to identifying tags/markers and/or extensions in the source column of the conversion look-up table. As pictured, subsequent rows are used to identify source/target pairs and accompanying transformation filters. For example, to translate XML 1004 into XSL-FO format 1005 an Apache Xalan filter 1006 may be employed. Another example shows that XSL-FO format 1007 may be translated to PDF format 1008 by employing an Apache FOP filter 1009. It should be noted that for more complex transformations, e.g., XML directly into PDF, that transformation pairs may be linked in sequence. For example, an XML transformation into PDF may be achieved by first converting XML into XSL-FO 1006 by way of a Xalan filter, and then from the intermediate XSL-FO into PDF format by way of the Apache FOP filter 1009. Such sequenced links may be achieved by simply searching the paired table to make sure there are enough intermediate formats to allow for a final conversion. Of course, other transformation lookups may be employed such as those discussed in co-pending US Patent Application entitled "Method of Constructing a Composite Image" filed on Aug. 17, 2001 in the name of E. Michael Fitzsimons, Brian G. Fitzsimons, and Erik Richard Langenbach.

Upon identifying a transformation filter 254, data 201 is imported 255 employing the transformation filter to convert textual data, page element geometries (if present), page element tags (if present), graphics (if present), gamma values (if present), color correction tables (if present), and/or the like. Page element tags simply identify data types such as XML tags. Upon converting the initial data set, the DCT provides the converted data 256 to the DTCT 222. The DTCT flows the converted data into its current template and page elements by matching tags from the converted data to those of page elements in the current template, or by being directed either automatically or into user selected page elements (as will be discussed in greater detail in FIG. 3).

Any editing of the page elements or data flowed within the data sets may be tracked 257 as edit states 223. Editing may be accomplished as discussed in co-pending US Patent Application entitled "Method of Constructing a Composite Image" filed on Aug. 17, 2001 in the name of E. Michael Fitzsimons, Brian G. Fitzsimons, and Erik Richard Langenbach, and FIG. 3. In one non-limiting example embodiment, the current data structure containing the current template view is simply pushed onto a stack in whole as editing is initiated. Upon each successive edit, another version of the now edited live data structure is pushed onto this stack to create a stack of edit states 223, which may be then applied and/or saved to this particular template view, or to an entire collection of template views. A singular template with a particular arrangement of page elements and geometry may be used to provide a uniform output view for varying data sources 201. The template is specified with a specific output device. However, there may be master templates that have elements common to several individual templates for various and disparate output devices, i.e., template collections. Edits may be made to apply to individual templates and to entire template collections as will be discussed in further detail in FIG. 3.

Upon having flowed 256 and/or editing 257 the desired data into a template the DTCT may save, transform, and/or otherwise composite 259 these items into a final output document 230. The DTCT can use the current template view and data and apply transformations 119*a*, 258 using the transformation library 219. A user informs the DTCT of a desired device/format to which they wish to convert the current template and data. In one non-limiting example embodiment, this may be accomplished by querying the transformations database 219 of all known output templates/devices 119*c* and building a selection list from which the user may select a desired output device. Upon the user selecting an output template/device, the output device template is loaded and the current template's data is transformed 258*b* into the now loaded output device template and re-flowed. The re-flowing and resizing of page elements may be based by a format transformation table 119*a*, FIG. 5, FIG. 6. Generally, the transformation tables inform the DTCT how to re-flow text by matching tags from the source template to the output template, by changing font sizes appropriate to the output device, changing page element sizes, graphic elements, and/or the like. Upon The user may further edit data and page elements in the output device template as with any templates. Thereafter, the user may save the templates with data as transformed composites 259 that may be used as final output for their target devices 230. The output composites 230 may be saved in content repositories 201*c*.

Data Transformation System

Figure 3:
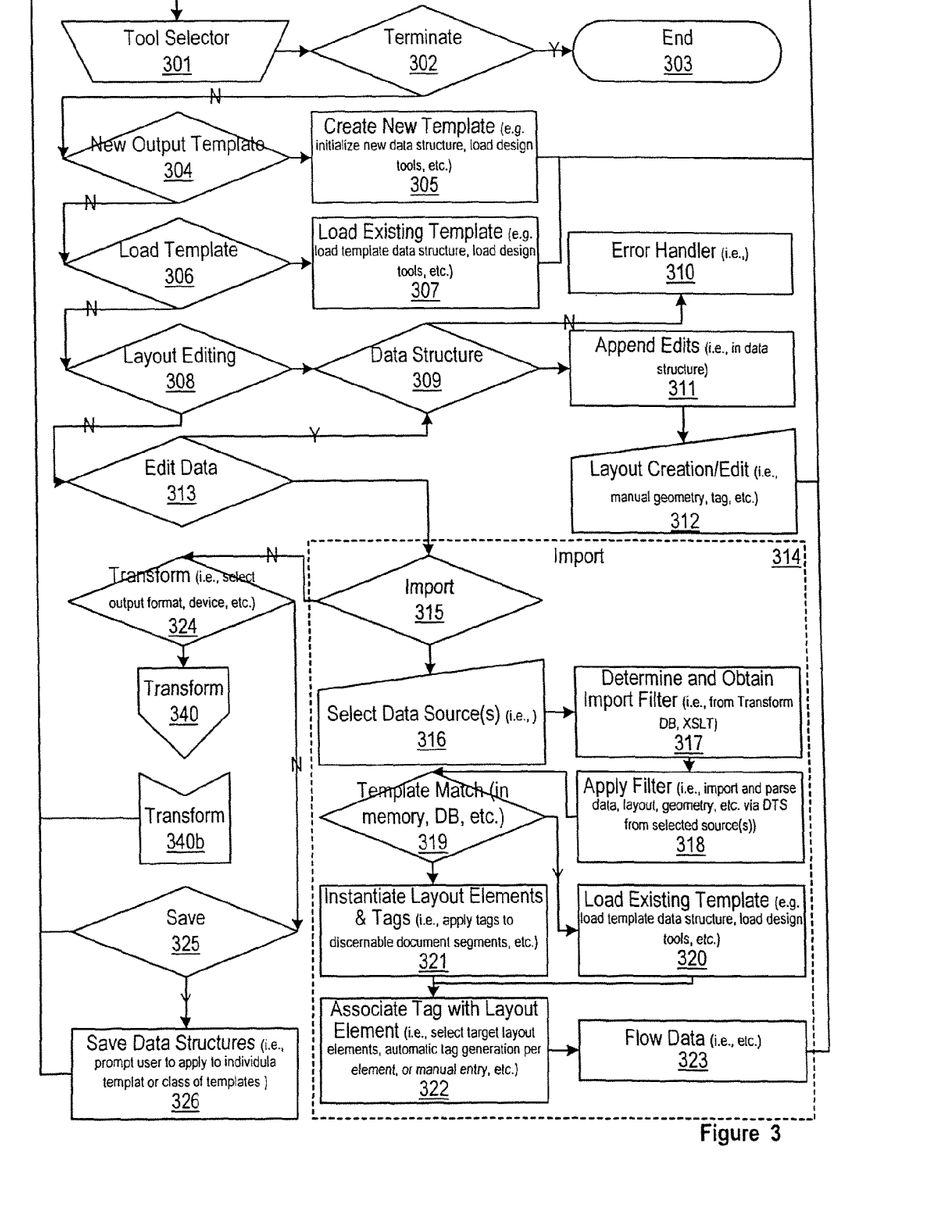
FIG. 3 illustrates one non-limiting example overview logic-flow diagram of a data transformation client tool.

FIG. 3 illustrates one non-limiting example overview logic-flow diagram of a data transformation client tool. Initially a DTCT 222 is loaded into memory on a client machine and executed. The DTCT allows a user to select on of several tool facilities 301. DTCT facilities include, but are not limited to, allowing a user to: create a new template 304, loading an existing template 306, editing the layout, i.e., geometries, of page elements in a currently loaded template 308, editing the data within page elements 313, importing data into the template and/or page elements 315, transforming the currently loaded template view into a desired output view 324, saving a template/data view 325, terminating the DTCT's execution 302, and/or the like. It should be noted that the execution flow depicted in FIG. 3 is just one example, and actual flow may be re-arranged still achieving the same effect, and all such variants are contemplated by the present disclosure.

Thus, the tool selector facility 301 allows a user to specify a termination of the DTCT. Selection of tool facilities in one non-limiting example may be achieved via interaction of a pointing element, e.g., a cursor as controlled by a mouse, with GUI widget elements. A user evinces their desire to execute a facility by engaging a GUI element with the pointing element.

If the user engages a GUI element with the pointing device, this will send a signal and create a flag signifying that the user wishes the facility associated with the GUI element to be executed.

Terminate

If the DTCT detects that the user selected a terminate facility 302, e.g., the user selected an "Exit" command from a menu GUI widget, thereupon the DTCT will generate a signal to stop further execution 303.

New Template

If termination was not engaged 302, then the DTCT will check if the user desired to make a new template 304. If the user selected to create a new template 304, a default template is created. The default template will load in geometries for a default device. A new data structure will be created into which the default template is loaded, and any required design tools will also be loaded 305. In one example, the default template will be a web page, and the proper device geometries will be loaded, e.g., the geometries may assume the native file format is XML, and the viewing geometries will assume a page width of 800 pixels with a potentially infinitely long vertical length. In an alternative embodiment, users may specify which templates/devices they wish to act as a default for new templates 304. Upon creation of the new data structure with loaded default template, flow cycles back to examining if the user has engaged/selected any facilities 301.

Load Template

If the user did not select to create a new template 304, then the DTCT will determine if the user made a selection to load an existing template 306; if so, then the DTCT will present the user with a template selection facility. In one non-limiting example embodiment, the template selection facility is displayed in a dialogue box. The dialogue box displays all known templates by having the DTCT query the transformations database 219 of all known output templates/devices 119c and building a selection list from which the user may select a desired template. Upon the user selecting an output template/device, the device template is loaded. In an alternative embodiment, the template selection facility simply displays the current file system and allows the user to navigate to a desired template file, which is loaded upon selection. Upon selecting a template to load, the DTCT instantiates a new data structure and loads the template into memory 307 similarly to how a new template is loaded 305. Upon loading the existing template, flow cycles back to examining if the user has engaged/selected any facilities 301.

Edit Layout

If the user did not select to load a template 306, then the DTCT will determine if the user made a selection to edit the layout of page elements in the currently loaded template 308. Editing the layout allows the user to modify the geometric positioning and size of page elements. The user may make edits by using a pointer to select layout editing tools such as discussed in co-pending US Patent Application entitled "Method of Constructing a Composite Image" filed on Aug. 17, 2001 in the name of E. Michael Fitzsimons, Brian G. Fitzsimons, and Erik Richard Langenbach. Before editing is allowed, the DTCT will check to see that a data structure has been allocated in memory and that a view with page elements has been instantiated in said data structure to allow for such editing 309. If no such data structure has been loaded and/or instantiated an error is generated and handled by an error handler 310, e.g., reporting that there is no current document to be edited to the user. If a data structure exists 309, before edits are made, the data structure in its current state is pushed onto a stack 311. Upon pushing the current edit state of the current template view onto a stack (or any other appropriate data structure allowing for the appending and access of edited states, such as, but not limited to a linked list, an array, hash, and/or the like), the user's edit of page element geometry is effected 312. In one non-limiting example embodiment, the user may select page element and change the page element's geometry by clicking and dragging bounding boxes that circumscribe the page elements. In an alternative embodiment, the user may select a page element and then enter dimensions into dialogue box that will change the bounding box geometric dimensions for the selected page element, e.g., corresponding to point of origin, and Cartesian dimensions. Upon effecting an edit of the layout 312, flow cycles back to examining if the user has engaged/selected any facilities 301.

Edit Data

If the user did not select to edit the layout of a template 308, then the DTCT will determine if the user made a selection to edit the data within page elements in the currently loaded template 313. The user may make edits by using a pointer to select the data within page elements with editing tools such as discussed in co-pending US Patent Application entitled "Method of Constructing a Composite Image" filed on Aug. 17, 2001 in the name of E. Michael Fitzsimons, Brian G. Fitzsimons, and Erik Richard Langenbach. Before editing is allowed, the DTCT will check to see that a data structure has been allocated in memory and that a view with page elements has been instantiated in said data structure to allow for such editing 309. If no such data structure has been loaded and/or instantiated an error is generated and handled by an error handler 310, e.g., reporting that there is no current document to be edited to the user. If a data structure exists 309, before edits are made, the data structure in its current state is pushed onto a stack 311. Upon pushing the current edit state of the current template view onto a stack (or any other appropriate data structure allowing for the appending and access of edited states, such as, but not limited to a linked list, an array, hash, and/or the like), the user's edit of page element data is effected 312. In one non-limiting example embodiment, the user may highlight data within a page element and change the textual font attributes. In an alternative embodiment, the user may change the page element tags. Each page element may have a tag. This facilitates compositing data, such as but not limited to, properly tagged XML data into XML style sheet and/or template views of data. Furthermore, page elements may have custom attributes and tags associated that all may be varied. Variation of such attributes may be accessed, edited, and affected through a dialogue box. The attributes for each page element would be read from current data filled template into the dialogue box where they may be edited, and upon engaging a mechanism to accept the changes, e.g., and "OK" button widget, the changes would be affected into the data structure embodying the current data filled template. Upon effecting an edit of the data 313, flow cycles back to examining if the user has engaged/selected any facilities 301.

Import Data

If the user did not select to edit the data within a currently loaded template 313, then the user may choose to import data 314. The DTCT will determine if the user made a selection to import data into page elements in the currently loaded template 315; if so, then the DTCT will present the user with a data selection facility. In one non-limiting example embodiment, the template selection facility is displayed in a dialogue box. The dialogue box displays all known data by having the DTCT query the transformations database 219 of all known data in various content repositories 119d and building a selection list from which the user may select data. Upon the user selecting data in the list 316, the data is loaded. In an alternative embodiment, the data selection facility simply displays the current file system and allows the user to navigate to a desired data file, which is loaded upon selection. Upon selecting data to load 316, the DTCT determines and obtains a conversion filter 317. The determination of the correct conversion filter may be largely off loaded to a DCT as discussed in 253 of FIG. 2. In an alternative embodiment, the DCT functionality may be integrated into the DTCT. Upon determining the proper conversion filter 317, a filter is then applied to the converted data 318. The filter parses the converted data to determine as many attributes as is possible, such as, but not limited to, textual formatting (e.g., font, type size, color, indentation, and/or the like), page element geometries (if present), page element tags (if present), and/or the like 318. A parsed element will be made for each tag unearthed by the parsing. In an alternative embodiment, tags will be created for each media variant discerned from the converted data; i.e., if converted Microsoft word document contained text, a table, three graphics images, and movie file, then a tag would be parsed and or generated for the text, another for the table, three tags would be generated for each of the graphics images, and one for the movie data.

Upon parsing out the converted data 318, the DTCT will determine if the parsed elements match an existing template 319. This may be done by comparing page element tags from the parsed and converted data to page element tags for any templates currently loaded in memory and/or existing in the transformations database 119*b*, 119*c*. If page element tags are found to match tags in existing templates, the matching template is loaded if it is not already in memory 320. In an alternative embodiment, if a template is already loaded into memory, and the user has highlighted (through a selection) a page element prior to selecting the import command, then any converted contents resulting from the import command will flow selected converted data sources into the highlighted page elements 323.

If the parsed elements do not match any existing templates 319, then the DTCT will automatically create and instantiate page elements and tags 321. Automatic instantiation begins with creating a new template as already discussed 305. Upon creating a blank template, the parsed elements are used to create page elements. A new page element will be created for each parsed element. If any geometry was parsed for any of the parsed elements, the parsed geometry will be applied in creating associated page elements in the new template. Similarly, if any tags and/or other discernable attributes are discerned to be associated with parsed elements, those attributes will be applied and/or associated with the newly created page elements in the newly created template. In the case where no tags and/or other parsed elements are discerned by the parser, e.g., a plain ASCII text file or image file, then a single page element will be created and tagged, e.g., respectively tagged as a text element or image element.

Upon automatic page element instantiation 321 or loading of an existing template 320, the DTCT will create associations between the converted-parsed data and page elements in the currently loaded template 322. Associations may be created by matching page element tags from the parsed and converted data with page element tags for the currently loaded template. In an alternative embodiment, upon making any associations 322, the user may be allowed to edit and/or create additional page elements 312 and edit their tags 312 to refine any associations made by the DTCT 322. Upon associating the tags from the converted and parsed data with a loaded template's page element tags 322, data is flowed into the loaded template's page elements 323. The tags parsed from the converted data identify which portions of the data are to be flowed into the loaded template's page elements by flowing said data respective to tag associations. In an alternative embodiment, an association is created when a template is already loaded into memory, and the user has highlighted (through a selection) a page element prior to selecting the import command, then any converted contents resulting from the import command will flow selected converted data sources into the highlighted page elements 323. Upon flowing the data 323, logic flow cycles back to examining if the user has engaged/selected any facilities 301.

Transform Data

Figure 4:
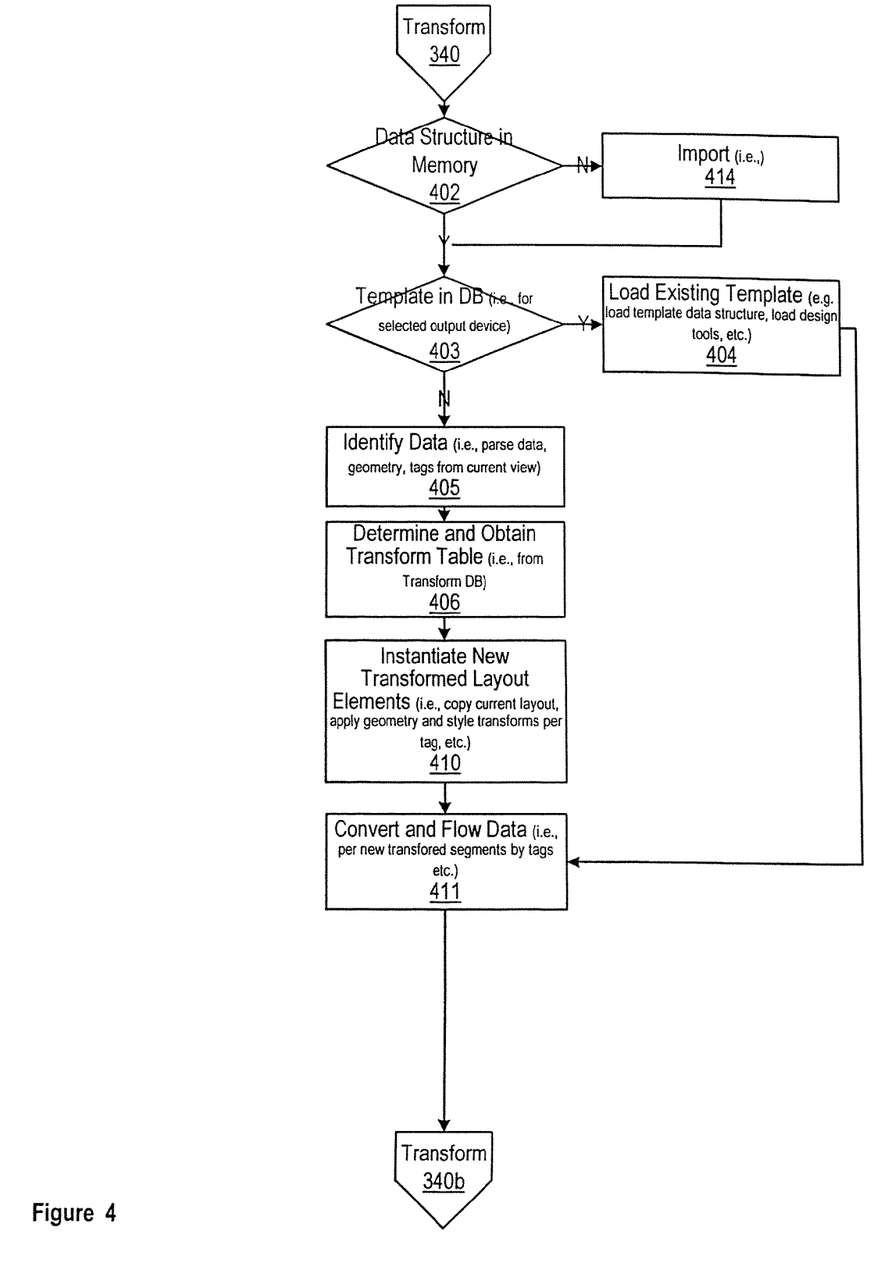
FIG. 4 further illustrates a non-limiting example overview logic-flow for transforming data continued from FIG. 3.

If the user did not select to import data 314, then the DTCT will determine if the user made a selection to transform the data and page elements in the currently loaded template into another output view 324; if so, then the logic flow will continue from 340 on FIG. 3 to box 340 in FIG. 4. In one non-limiting example embodiment, if a transform is selected 324, then a device template selection facility is displayed in a dialogue box. The dialogue box displays all known devices by having the DTCT query the transformations database 219 of all known output devices 119*b* and building a selection list from which the user may select a desired device template. In an alternative embodiment, the device selection facility simply displays the current file system and allows the user to navigate to a desired device file. A device file may comprise basic geometry (e.g., output size dimensions, resolution density, color capability, and/or the like), tags, and attributes associated with a particular device. Devices may include PDAs, WAP enabled devices such as cell phones, web pages, print, and/or the like. Upon termination of flow in box 340*b* in FIG. 4, flow returns and transformation terminates at box 340*b* in FIG. 3. Upon transforming the data 340, logic flow cycles back to examining if the user has engaged/selected any facilities 301.

Save Data

If the user did not select to transform data 324, then the DTCT will determine if the user made a selection to save the data and currently loaded template 325; if so, then the current state of the template incorporating the latest edits 311 will be saved. Edits made 312 to the template may be saved to an individual template and/or to a collection of templates. In one non-limiting example embodiment, the user is prompted with a choice to determine if the changes made to the template should be saved to an individual and/or collection of templates. Further, the data populating the template is saved in its current form. In another embodiment, all the saved states 311 are also saved. Upon determining not to save 325 or saving 326 templates and data, logic flow cycles back to examining if the user has engaged/selected any facilities 301.

Transform Data Continued

FIG. 4 further illustrates a non-limiting example overview logic-flow for transforming data continued from 340 on FIG. 3. Initially, the DTCT determines if a template with data is loaded in memory 402. If no data structure exists containing a template, an import facility is engaged 414 as already described in 314 of FIG. 3. In an alternative embodiment, an error is generated noting that there is no working document. Upon successfully importing 414 or determining a template exists in memory 402, the DCS determines if any templates exist matching the characteristics of the selected desired device output 340 of FIG. 3. In an alternative embodiment, such a determination may be made integrated into the DTCT. This may be achieved by comparing the basic characteristics from the selected device file to templates stored in a transformation database 119 through a query. If templates exist for the selected device type 403, then a matching template will be loaded 404 as described before 307 of FIG. 3. If more than one template match, the user may be presented with a template selection facility as discussed before. If no matching templates exist 403, then the currently loaded template and data are parsed and page elements are identified 405. Common page elements may be identified in transformation tables integrated directly into the DTCT. It should be noted if the parsed elements are not common, scripting may transformation scripting may be employed and executed by a CSE. Each of the page elements' tags, textual formats, and geometries (and other present attributes) are identified in the current view of the currently loaded template. The DCS determines and obtains a transformation filter 406. The determination of the correct transformation filter may be simply determined through scaling. Source geometry is obtained for the currently loaded template when identifying data 405. Target geometry is obtained for the desired device output 340 of FIG. 3. The DCS computes a scale from the currently loaded template's geometric dimensions as compared to the target device's geometry. For example, if the currently loaded template is for a web page with dimensions of 800 by 600 pixel elements, and the desired output device is a PDA with dimension read to be 400 by 300 pixel elements, the scaling factor will be 50%. In an alternative embodiment, if the DTCT is the target device, then the source data is transformed into page elements, text formatting, and geometry that is fit to the geometric dimensions of the displaying device, e.g., in one non-limiting example, the display device, which in this case is the DTCT, may be a window on a computer display that is resizable.

In an alternative embodiment, a transformation table may be implemented similarly to the conversion filter 317 of FIG. 3. A transformation table would contain the following columns: column one identifying the source format, column two identifying the desired output device, column three a tag attribute, and column four a scaling factor for the transformation. In another embodiment, a fifth column contains reference to a conversion filter for data conversion as discussed in FIG. 10. In yet another embodiment, a sixth column would contain other transformative attributes.

Upon determining and obtaining a transformation table 406, the DCS instantiates a new transformed template 410, and the template is provided to the DTCT. A new template is created as discussed in 305 of FIG. 3 with geometry based on the desired output device 340 of FIG. 3. Upon creation of the new template, page elements from the currently loaded source template are copied to the newly created output device template. The copied page elements are automatically transformed based on the attributes and/or scale factors determined by the transform table 406. For example, a text page element in a currently loaded web page template that was 400 pixels by 200 pixels with a text size of 20 point Helvetica, might be scaled down by 50% for PDA use resulting in a text box of 200 pixels by 100 pixels with a font size of 10 point Helvetica. Upon transforming the device output layout 410 or loading and existing template 404, the data is re-flowed and converted if necessary 411 into the tagged page elements. The resulting composited template and data may need to be converted if the output device is known not to be capable of reading only certain types of formats. For example, if the output device is a PDA that can only read PDF format files, and the currently transformed document is in XML, a data conversion will need to take place. The output devices known display formats may be supplied by the user; alternatively they may be supplied into column five of the transformation table as discussed above 406. The currently transformed template layout and data may be saved and then provided to the DCS for conversion. Upon flowing the data 411, logic flow cycles back 340b to examining if the user has engaged/selected any facilities 301 of FIG. 3.

Document Structure Conversion

Figure 8:
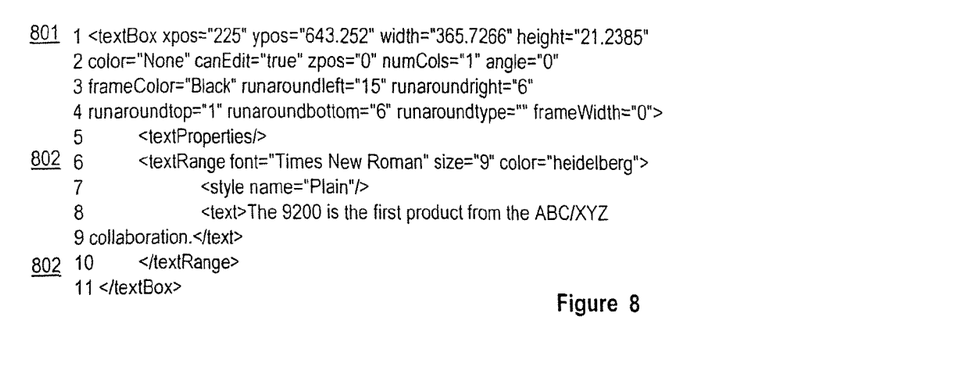
FIG. 8 illustrates one non-limiting example an XML document excerpt.

FIG. 8 illustrates one non-limiting example an XML document excerpt. Line 1 801 shows that there is a text box formed starting at Cartesian coordinates X=225, Y=643.25, the box having a width of 365.7266 pixels and a height of 21.2385 pixels. Another element found on lines 6 and 10 802 is the text range attribute that establishes the formatting of a text string. There are many other tokenized elements found in FIG. 8 conforming with XML.

Figure 5:
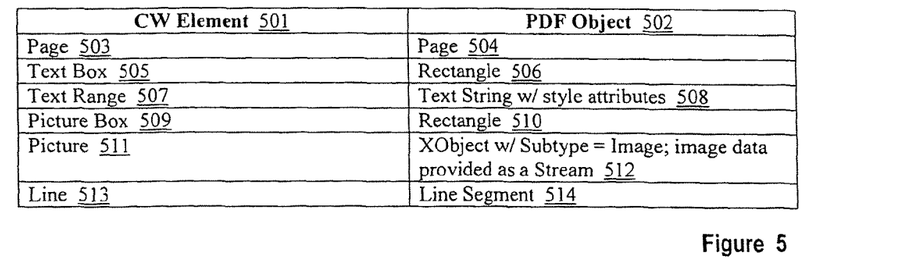
FIGS. 5 and 6 illustrate format conversion details.
Figure 6:
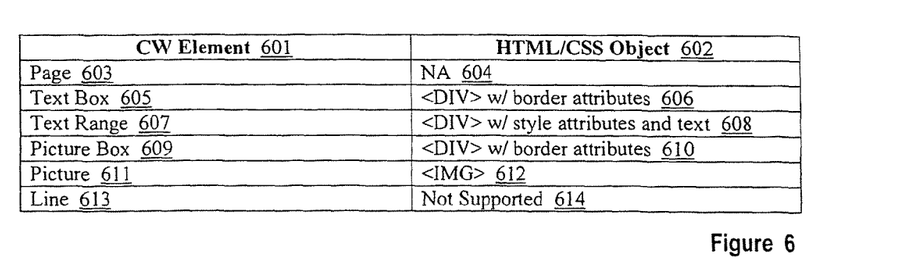

FIGS. 5 and 6 illustrate format conversion details. FIG. 5 shows a simplified explanation of the conversion of XML tokens 501 into PDF token descriptors 502. In this example tokens demarking a "Page" 503 in XML remain the same in PDF 504 format. However, one notes the textbox 505, 801 XML token is replaced with a Rectangle 506 construct in PDF. Similarly, the textRange XML construct 507, 802 is replaced with a text string with style attributes 508 in the PDF format.

FIG. 6 shows a simplified explanation of the conversion of XML tokens 601 into HTML/CSS token descriptors 602. In this example tokens demarking a "Page" 603 in XML are not available in HTML and thus are not included 604. Furthermore, the textbox 605, 801 XML token is replaced with a "<DIV>" token with border attributes 606 in HTML. Similarly, the textRange XML construct 607, 802 is replaced with a "<DIV>" token and supporting style attributes and text 608 in the HTML format. As discussed earlier in FIG. 10, indirect conversions may use intermediary formats.

Content Scripting Engine

Figure 7:
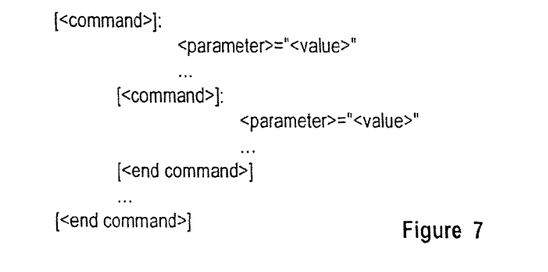
FIGS. 7 and 9 illustrate one non-limiting example a transformation script excerpt and structure.
Figure 9:
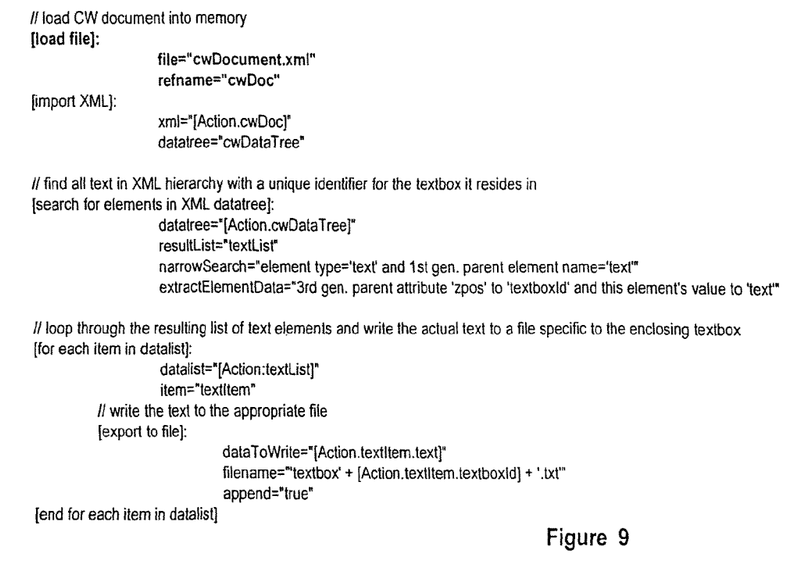

FIGS. 7 and 9 illustrate one non-limiting example a transformation script excerpt and structure. As can be seen in FIG. 7, the basic transformation script structure is shone t be one of a "[<command>]:" followed by "<parameter>" equating to a "<value>". FIG. 9 provides a pseudo code example script following the basic structure shown in FIG. 7. In particular, on may see that a command is issued to "[load file]:" specifying the parameter "file," which is a file name to be of a value "cwDocument.xml".

Greater detail as to the operation of the transformation scripts for a CSE and the DCT may be found in co-pending applications entitled "Computer File Transfer System," Ser. Nos. 08/941,442 and 09/536,014.

It should be understood that the above description is only representative of illustrative embodiments. For the convenience of the reader, the above descriptions have focused on a representative sample of all possible embodiments, a sample that teaches the principles of the invention. The description has not attempted to exhaustively enumerate all possible variations. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that the embodiments and variations shown and described herein are merely illustrative of the principles of this invention and that various modifications may be implemented without departing from the scope and spirit of the invention.

What is claimed is:

1. A method for using a computer system to transform information, comprising:

creating a target document in a desired output format for a desired output device;

creating page elements in the target document that correspond to page elements from a source document;

extracting information from the page elements from the source document and populating the target's page elements with the extracted information, the extracted information being textual data information, element geometry information, page element tag information, graphics information, gamma value information, and color correction information;

generating a transformation table from a transformation database including a format structure table, a device geometries table, an output template table, and a content repository table; and transforming, using a transformation table, the page elements in the target document with formatting appropriate to the desired output format and desired output device.

2. The method of claim 1, further comprising:
saving a document.

3. The method of claim 2, wherein saving the document also saves document formatting to a collection of associated documents.

4. The method of claim 1, further comprising:
saving a composite document including a formatting document, page elements, and information.

5. The method of claim 1, further comprising
converting a composite document including a formatting document, page elements, and information into another document format.

6. A system for using a computer system to transform information, comprising:

means to create a target document in a desired output format for a desired output device;

means to create page elements in the target document that correspond to page elements from a source document;

means to extract information from the page elements from the source document and populating the target's page elements with the extracted information, the extracted information being textual data information, element geometry information, page element tag information, graphics information, gamma value information, and color correction information;

means to transform, using a transformation table, the page elements in the target document with formatting appropriate to the desired output format and desired output device, wherein the means to transform includes means for generating a transformation table from a transformation database including a format structure table, a device geometries table, an output template table, and a content repository table.

7. The system of claim 6, further comprising:
means to save a document.

8. The system of claim 7, wherein saving the document also saves document formatting to a collection of associated documents.

9. The system of claim 6, further comprising:
means to save a composite document including a formatting document, page elements, and information.

10. The system of claim 6, further comprising
means to convert a composite document including a formatting document, page elements, and information into another document format.

11. A computer program stored on a computer readable medium, the program, comprising:
a module to create a target document in a desired output format for a desired output device;

a module to create page elements in the target document that correspond to page elements from a source document;

a module to extract information from the page elements from the source document and populating the target's page elements with the extracted information, the extracted information being textual data information, element geometry information, page element tag information, graphics information, gamma value information, and color correction information;

a module to transform, using a transformation table, the page elements in the target document with formatting appropriate to the desired output format and desired output device, wherein the module to transform includes a data conversion server generating a transformation table from a transformation database including a format structure table, a device geometries table, an output template table, and a content repository table.

12. The medium of claim 11, further comprising:
a module to save a document.

13. The medium of claim 12, wherein saving the document also saves document formatting to a collection of associated documents.

14. The medium of claim 11, further comprising
a module to save a composite document including a formatting document, page elements, and information.

15. The medium of claim 11, further comprising:
a module to convert a composite document including a formatting document, page elements, and information into another document format.

16. An information transformation apparatus, comprising:
a processor;
a memory, communicatively connected to the processor;
a program, stored in the memory, including,
a module to create a target document in a desired output format for a desired output device;

a module to create page elements in the target document that correspond to page elements from a source document;

a module to extract information from the page elements from the source document and populating the target's page elements with the extracted information, the extracted information is textual data information, element geometry information, page element tag information, graphics information, gamma value information, and color correction information;

a module to transform, using a transformation table, the page elements in the target document with formatting appropriate to the desired output format and desired output device, wherein the module to transform includes a data conversion server generating a transformation table from a transformation database including a format structure table, a device geometries table, an output template table, and a content repository table.

17. The apparatus of claim 16, further comprising:
a module to save a document.

18. The apparatus of claim 17, wherein saving the document also saves document formatting to a collection of associated documents.

19. The apparatus of claim 16, further comprising:
a module to save a composite document including a formatting document, page elements, and information.

20. The apparatus of claim 16, further comprising:
a module to convert a composite document including a formatting document, page elements, and information into another document format.

* * * * *